US008417942B2

(12) United States Patent
Dunn et al.

(10) Patent No.: US 8,417,942 B2
(45) Date of Patent: Apr. 9, 2013

(54) SYSTEM AND METHOD FOR IDENTIFYING ENCRYPTED CONFERENCE MEDIA TRAFFIC

(75) Inventors: Chris A. Dunn, Livermore, CA (US); Jawhny X. Cooke, Sacramento, CA (US); Zaheer Aziz, Richardson, TX (US); Ravid Sagy, Beit Yitzhak (IL)

(73) Assignee: Cisco Technology, Inc., San Jose, CA (US)

( * ) Notice: Subject to any disclaimer, the term of this patent is extended or adjusted under 35 U.S.C. 154(b) by 878 days.

(21) Appl. No.: 11/848,650

(22) Filed: Aug. 31, 2007

(65) Prior Publication Data
US 2009/0063856 A1 Mar. 5, 2009

(51) Int. Cl.
*H04L 29/06* (2006.01)
(52) U.S. Cl. .................. 713/160; 370/252; 370/230.1; 726/13
(58) Field of Classification Search .......... 713/160; 726/13; 370/252, 230.1
See application file for complete search history.

(56) References Cited

U.S. PATENT DOCUMENTS

| | | | | |
|---|---|---|---|---|
| 4,264,782 | A | 4/1981 | Konheim | 178/22 |
| 5,533,051 | A | 7/1996 | James | 375/240 |
| 5,734,892 | A | 3/1998 | Chu | |
| 5,813,011 | A | 9/1998 | Yoshida et al. | 707/101 |
| 5,832,490 | A | 11/1998 | Riley | |
| 5,963,909 | A | 10/1999 | Warren et al. | 705/1 |
| 6,115,797 | A | 9/2000 | Kanda et al. | |
| 6,148,082 | A | 11/2000 | Slattery et al. | 380/212 |
| 6,226,383 | B1 | 5/2001 | Jablon | 380/30 |
| 6,532,121 | B1 | 3/2003 | Rust et al. | 360/8 |
| 6,584,520 | B1 | 6/2003 | Cowart et al. | |
| 6,744,785 | B2 | 6/2004 | Robinett et al. | 370/486 |
| 6,768,818 | B2 | 7/2004 | Friederich et al. | 382/233 |
| 6,791,975 | B1 * | 9/2004 | Aktas et al. | 370/356 |
| 6,831,969 | B2 | 12/2004 | Ju | 379/142.16 |
| 6,920,154 | B1 | 7/2005 | Achler | 370/477 |
| 6,996,717 | B2 | 2/2006 | Yin et al. | 713/176 |
| 7,020,284 | B2 | 3/2006 | Boykin et al. | 380/200 |
| 7,062,048 | B2 | 6/2006 | Livaditis et al. | 380/341 |
| 7,124,303 | B2 | 10/2006 | Candelore et al. | 713/193 |
| 7,131,004 | B1 | 10/2006 | Lyle | 713/169 |
| 7,140,036 | B2 | 11/2006 | Bhagavatula et al. | 726/2 |
| 7,143,095 | B2 | 11/2006 | Barrett et al. | 707/10 |
| 7,151,832 | B1 | 12/2006 | Fetkovich et al. | 380/210 |
| 7,283,904 | B2 | 10/2007 | Benjamin et al. | 701/117 |

(Continued)

OTHER PUBLICATIONS

Peterson, "Session Initiation Protocol (SIP) Authenticated Identity Body (AIB) Format," Network Working Group, pp. 1-13, Sep. 2004.

(Continued)

*Primary Examiner* — Ashok Patel
*Assistant Examiner* — Brian Shaw
(74) *Attorney, Agent, or Firm* — Baker Botts L.L.P.

(57) ABSTRACT

A method for identifying conference media traffic includes receiving a plurality of dummy packets and matching a series of the plurality of dummy packets to a signature key. The method also includes extracting a first identification from one or more of the plurality of dummy packets in response to matching a series of the plurality of dummy packets to a signature key and determining that a second identification associated with one or more encrypted media packets matches the first identification. The method also includes associating one or more encrypted media packets with a conference in response to determining that the first identification matches the second identification.

16 Claims, 3 Drawing Sheets

U.S. PATENT DOCUMENTS

| | | | | |
|---|---|---|---|---|
| 7,342,966 | B2 | 3/2008 | Lepine et al. | 375/240.24 |
| 7,457,415 | B2 | 11/2008 | Reitmeier et al. | |
| 7,558,953 | B2 | 7/2009 | Osthoff et al. | |
| 7,562,213 | B1* | 7/2009 | Timms | 713/160 |
| 2002/0025045 | A1 | 2/2002 | Raike | |
| 2002/0085734 | A1 | 7/2002 | Keeney et al. | 382/100 |
| 2002/0118828 | A1 | 8/2002 | Yoshimura et al. | |
| 2003/0016630 | A1* | 1/2003 | Vega-Garcia et al. | 370/252 |
| 2003/0217165 | A1 | 11/2003 | Buch et al. | 709/229 |
| 2004/0091114 | A1 | 5/2004 | Carter et al. | |
| 2004/0189689 | A1 | 9/2004 | Barrett | |
| 2004/0210762 | A1 | 10/2004 | Kawamoto et al. | |
| 2004/0237110 | A1 | 11/2004 | Jones, Jr. | 725/74 |
| 2004/0258243 | A1 | 12/2004 | Shin et al. | 380/210 |
| 2005/0005205 | A1* | 1/2005 | Shiue et al. | 714/700 |
| 2005/0025048 | A1 | 2/2005 | Masuda et al. | 370/229 |
| 2005/0050424 | A1 | 3/2005 | Matsuura | |
| 2005/0120208 | A1* | 6/2005 | Albert Dobson | 713/160 |
| 2005/0169465 | A1 | 8/2005 | Itani | 380/42 |
| 2005/0216669 | A1 | 9/2005 | Zhu et al. | 711/118 |
| 2005/0256722 | A1 | 11/2005 | Clark | 704/500 |
| 2005/0286778 | A1 | 12/2005 | Atsumi | 382/232 |
| 2006/0010151 | A1 | 1/2006 | Star Sung | |
| 2006/0059213 | A1 | 3/2006 | Evoy | |
| 2006/0064746 | A1* | 3/2006 | Aaron et al. | 726/13 |
| 2006/0123248 | A1 | 6/2006 | Porter et al. | 713/193 |
| 2006/0222178 | A1 | 10/2006 | Kuwabara et al. | |
| 2006/0230014 | A1 | 10/2006 | Kedem et al. | |
| 2006/0239636 | A1 | 10/2006 | Sugiyama et al. | 386/44 |
| 2007/0109965 | A1* | 5/2007 | Davis | 370/230.1 |
| 2007/0192861 | A1* | 8/2007 | Varghese et al. | 726/23 |
| 2008/0037723 | A1* | 2/2008 | Milstein et al. | 379/88.12 |
| 2008/0046757 | A1 | 2/2008 | Staddon et al. | 713/189 |
| 2008/0055638 | A1 | 3/2008 | Okamoto et al. | |
| 2008/0084975 | A1 | 4/2008 | Schwartz | 379/88.22 |
| 2008/0101338 | A1 | 5/2008 | Reynolds et al. | 370/352 |
| 2008/0130883 | A1 | 6/2008 | Agaian et al. | 380/54 |
| 2008/0170627 | A1 | 7/2008 | Yamada et al. | |
| 2008/0207120 | A1 | 8/2008 | Kurina et al. | |
| 2008/0219575 | A1 | 9/2008 | Wittenstein | 382/238 |
| 2009/0006844 | A1 | 1/2009 | Wing et al. | 713/156 |
| 2009/0067629 | A1 | 3/2009 | Kraszewski | 380/251 |
| 2009/0077359 | A1 | 3/2009 | Chakravarthula et al. | 712/229 |
| 2009/0168892 | A1 | 7/2009 | McFarland et al. | 375/240.24 |
| 2009/0169001 | A1 | 7/2009 | Tighe et al. | 380/217 |
| 2009/0316895 | A1 | 12/2009 | Platt et al. | |
| 2009/0327751 | A1 | 12/2009 | Koifman et al. | |
| 2010/0008350 | A1 | 1/2010 | Yang et al. | |
| 2010/0014664 | A1 | 1/2010 | Shirai et al. | |
| 2010/0192234 | A1 | 7/2010 | Sugimoto et al. | |
| 2010/0235171 | A1 | 9/2010 | Takagi et al. | 704/500 |

OTHER PUBLICATIONS

Peterson et al., "Enhancements for Authenticated Identity Management in the Session Initiation Protocol (SIP)," Network Working Group, pp. 1-41, Aug. 2006.

USPTO, Office Action for U.S. Appl. No. 11/966,247 in the name of James Rodgers Tighe; 30 pages, Feb. 4, 2011.

USPTO; Office Action for U.S. Appl. No. 11/770,226 in the name of Daniel G. Wing; 13 pages, Apr. 4, 2011.

USPTO, Office Action for U.S. Appl. No. 11/966,156 in the name of Rowan L. McFarland, et al., 14 pages, Apr. 19, 2012.

USPTO, Final Office Action for U.S. Appl. No. 11/966,247, filed Dec. 28, 2007, Tighe, et al., 29 pages, Jun. 29, 2012.

USPTO, Office Action for U.S. Appl. No. 11/966,156 in the name of Rowan L. McFarland, et al., 19 pages, Jul. 18, 2011.

USPTO, Office Action for U.S. Appl. No. 11/966,156 in the name of Rowan L. McGarland, et al., 14 pages, Dec. 22, 2011.

USPTO, Office Action for U.S. Appl. No. 11/966,247 in the name of James R. Tighe; et al., 30 pages, Jul. 7, 2011.

USPTO, Offie Action for U.S. Appl. No. 11/966,247 in the name of James R. Tighe, et al., 28 pages, Feb. 3, 2012.

* cited by examiner

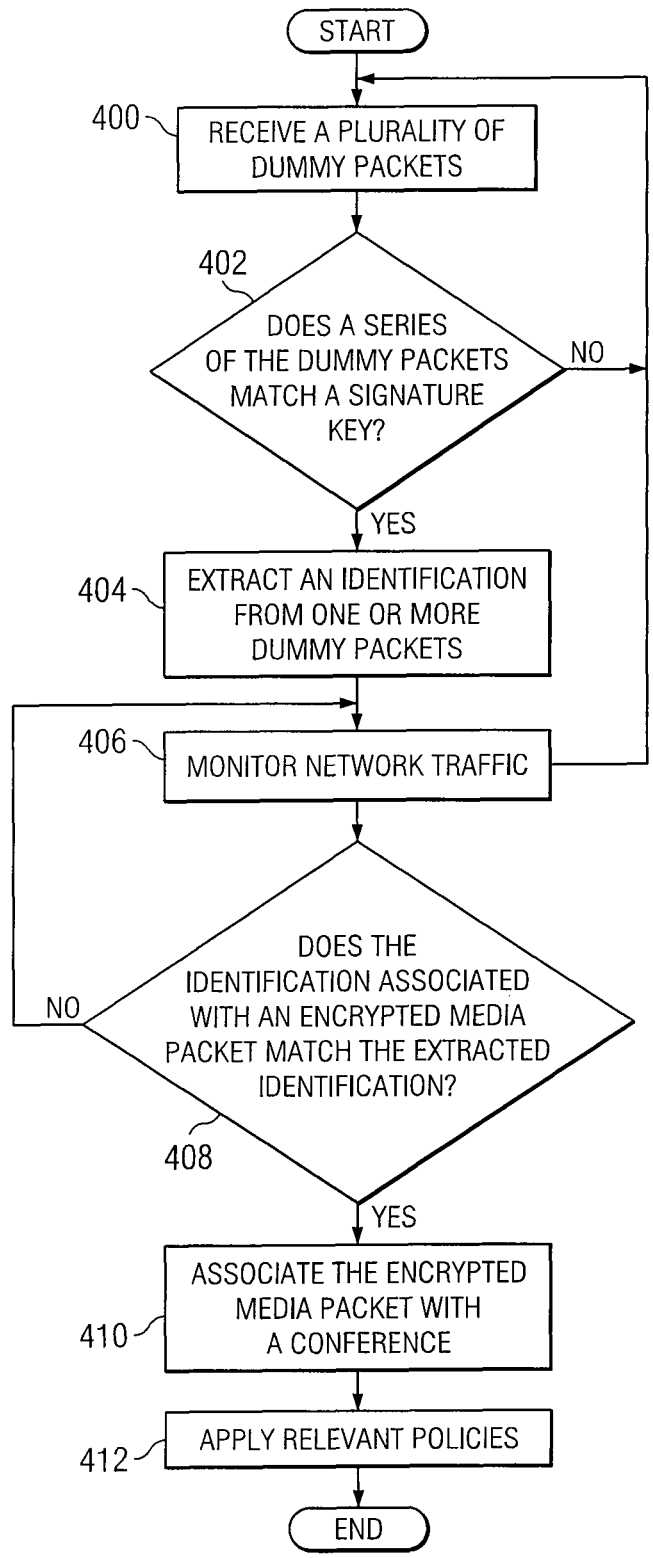

SYSTEM AND METHOD FOR IDENTIFYING ENCRYPTED CONFERENCE MEDIA TRAFFIC

TECHNICAL FIELD

This invention relates generally to the field of telecommunications and more specifically to a system and method for identifying encrypted conference media traffic.

BACKGROUND

There are many methods available which allow groups of individuals located throughout the world to engage in conferences. Such methods generally involve transmitting information and other data from communication equipment located at one conference site to communication equipment located at one or more remote locations.

SUMMARY OF THE DISCLOSURE

In accordance with particular embodiments, a method and system for identifying encrypted conference media traffic is provided that substantially eliminates or reduces disadvantages and problems associated with previous systems and methods.

In accordance with an embodiment, a method for identifying conference media traffic includes receiving a plurality of dummy packets and matching a series of the plurality of dummy packets to a signature key. The method also includes extracting a first identification from one or more of the plurality of dummy packets in response to matching a series of the plurality of dummy packets to a signature key and determining that a second identification associated with one or more encrypted media packets matches the first identification. The method also includes associating one or more encrypted media packets with a conference in response to determining that the first identification matches the second identification. The method may also include applying one or more policies to the one or more encrypted media packets in response to associating one or more encrypted media packets with a conference.

In a more particular embodiment, the first identification and the second identification may each comprise a source identification and a destination identification. The source identification and the destination identification may be defined by an Internet Protocol (IP) address.

In further embodiments, the signature key may be associated with the bit size of the dummy packet. Additionally, the signature key may be updated according to any suitable algorithm. For example, the signature key may be updated based on the time of day.

In accordance with another embodiment, a system for identifying encrypted media traffic includes an interface and a processor coupled to the interface. In an embodiment the interface is operable to receive a plurality of dummy packets and one or more encrypted media packets. The interface is operable to match a series of the plurality of dummy packets to a signature key and thereby extract a first identification from one or more of the plurality of dummy packets. The interface is further operable to determine that a second identification associated with one or more of the encrypted media packets matches the first identification and associate one or more of the encrypted media packets with a conference.

Certain embodiments may provide one or more technical advantages. For example, one technical advantage is facilitating the enforcement of conference and application specific policies for encrypted media. In particular, one or more embodiments enable the identification of encrypted conference media traffic so that any relevant quality of service policies may be enforced. Accordingly, conference participants may simultaneous receive the benefit of quality of service policies and secure conferencing.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its features and advantages, reference is now made to the following description, taken in conjunction with the accompanying drawings, in which:

FIG. 4 is a flowchart illustrating a method for identifying encrypted media traffic, in accordance with some embodiments.

DETAILED DESCRIPTION OF THE DRAWINGS

Figure 1:
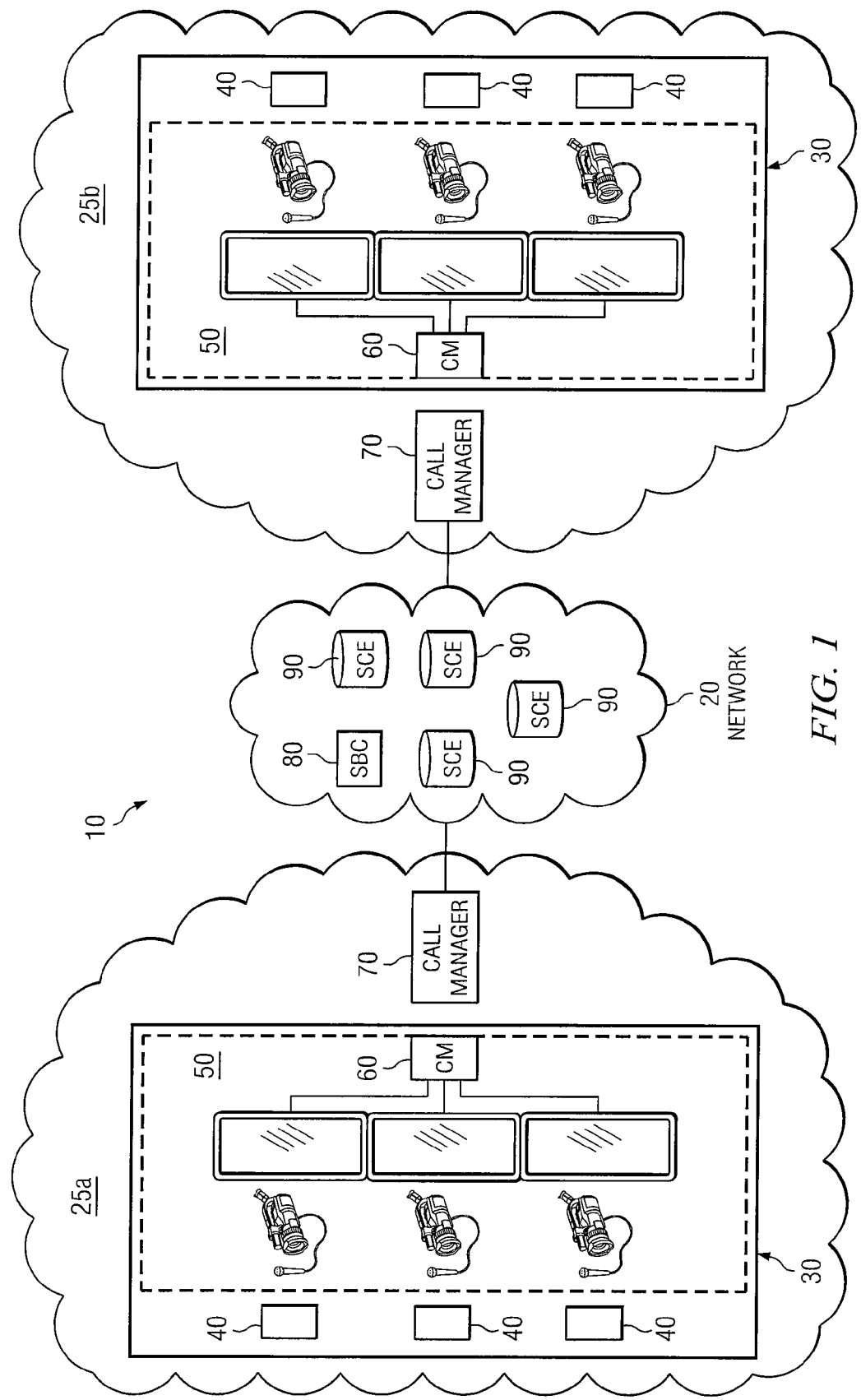
FIG. 1 is a simplified block diagram illustrating a system for conducting a multipoint conference, in accordance with some embodiments.

FIG. 1 is a block diagram illustrating a communication system 10 for conducting a multipoint videoconference. The illustrated embodiment includes a network 20 that may support conferencing between remotely located conference sites 30. Sites 30 may include any suitable number of users 40 that may participate in multiple videoconferences using conference equipment 50. A conference session may be supported by one or more conference managers 60, call managers 70, session border controllers 80, and/or service control engines 90. As used herein, a "conference" may include any communication session between a plurality of users transmitted using any audio and/or video means, including signals, data or messages transmitted through voice and/or video devices, text chat, and instant messaging.

When conference data is transmitted over a network, a certain level of security may be desired. Such security may be provided by encrypting the conference media data prior to transmission. While encryption may facilitate secure communications it may also prevent a service provider from enforcing relevant quality of service policies. In particular, if pursuant to a subscriber agreement a service provider desires to provide data associated with a conference higher priority (increased bandwidth, shortest path routing, preferential processing, etc.) the provider generally needs to inspect the data transmitted in the media packets. However, if the data is encrypted, the service provider may be prevented from applying the quality of service. Thus, individuals engaged in a conference may have to elect between having increased quality of service or secure communications.

According to an embodiment, 90 may identify Internet Protocol (IP) packets transporting encrypted media data associated with a conference and thereby apply any relevant quality of service policies. Such policies may include providing the conference media with reserved or increased bandwidth, priority routing, and/or faster processing. To enable the identification of encrypted conference media, conference manager 60 may transmit a series of dummy packets during the conference setup process. The dummy packets may be generated and transmitted in accordance with a defined signature which SCE 90 may match to a signature key. The dummy packet signature may serve to indicate that subsequent packets transmitted from a conference site to a remote conference site, or other destination, contain conference media data. Accordingly, responsive to receiving a series of dummy packets matching the signature key, SCE 90 may thereby enforce relevant policies for subsequent packets containing conference media data.

Network 20 represents communication equipment, including hardware and any appropriate controlling logic for interconnecting elements coupled to network 20. Generally, network 20 may be any network capable of transmitting audio and/or video telecommunication signals, data, and/or messages, including signals, data, or messages transmitted through text chat, instant messaging, and e-mail. In certain embodiments, network 20 may include all or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding.

To facilitate the described communication capabilities, network 20 may include routers, hubs, switches, gateways, call controllers, and or any other suitable components in any suitable form or arrangements. Additionally, network 20 may represent any hardware and/or software configured to communicate information in the form of packets, cells, frames, segments or other portions of data. Although network 20 is illustrated as a single network, network 20 may include any number or configuration of networks. Moreover, communication system 10 may include any number or configuration of networks 20.

In particular embodiments, network 20 and other components of communication system 10 may receive and transmit data in a session initiation protocol (SIP) environment. SIP is an application-layer control protocol that includes primitives for establishing, modifying and terminating communication sessions. SIP can also invite participants to already existing sessions, such as multipoint conferences. SIP works independently of underlying transport protocols and without dependency on the type of session that is being established. SIP may also transparently support name mapping and redirection services, which support personal mobility.

Enterprise networks 25*a*-25*b* ("enterprise networks 25") may each represent a privately owned and/or operated communication network. In particular embodiments, enterprise networks 25 may include one or multiple networks such as a telecommunications network, a satellite network, a cable network, local area networks (LANs), wide area networks (WANs), the Internet, Ethernet and/or any other appropriate networks. As illustrated in FIG. 1, enterprise networks 25 include a site 30 for facilitating conference sessions. Enterprise network 25 may also include any suitable collection of hardware, software, and controlling logic to interconnect elements coupled to the network and to support communications between attached devices.

Sites 30 represent conference facilities which may support videoconferencing between a local site and one or more remotely located sites 30. As illustrated in FIG. 1, each site 30 includes multiple users 40, conference equipment 50, and conference manager 60. In certain embodiments, sites 30 may be associated with a common enterprise. Alternatively, sites 30 may each be associated with any number of distinct enterprises. Accordingly, sites 30 may facilitate intra-enterprise or inter-enterprise conferencing.

User 40 represents one or more individuals or groups of individuals who may be present for a conference at a site 30. Users 40 may participate in the conference using any suitable device and/or component, such as audio IP phones, video phone appliances, personal computer (PC) based video phones, and streaming clients. During the conference, users 40 may engage in the session as speakers or participate as non-speakers.

As illustrated in FIG. 1, each site 30 includes conference equipment 50 for facilitating the described conferencing capabilities. Conference equipment 50 may include any suitable components for establishing and supporting a videoconference. For example, conference equipment 50 may include any suitable number or configuration of cameras, microphones, loudspeakers or monitors. In certain embodiments, conference equipment 50 may further include one or more user interfaces, controllers, or projectors to provide an enhanced conferencing experience for users 40. Additionally, conference equipment 50 may include any suitable software for facilitating a videoconference between remote locations.

Each site 30 may also include a conference manager 60 which interfaces with a communication network such as network 20. Conference manager 60 may include any suitable equipment including hardware and/or software for managing a multipoint conference. In operation, conference manager 60 may transmit and receive signals containing conference data to and from a remote site 30 via network 20. With respect to conferencing, the signals may be audio-video (A/V) signals which carry video data in addition to audio data. In certain embodiments, the A/V signals may be data streams that include media (audio and video) packets transmitted using Real-time Transport Protocol (RTP). RTP is a standardized packet format for transmitting audio and video packets over the Internet. Additionally, as described below, conference manager 60 may be operable to encrypt and/or decrypt A/V signals.

Call managers 70 include any suitable combination of hardware and/or software operable to establish a connection between a calling component of communication system 10 and a called component. Call managers 70 may be part of an enterprise network or be implemented by a service provider in a communication network such as network 20. In operation, call managers 70 may initiate, connect, and terminate a communication session between communications devices located at a site 30 or anywhere within communication system 10. Accordingly, in certain embodiments, call managers 70 may act as a private branch exchange (PBX) by supporting Internet Protocol (IP) PBX functions, such as hold, park, transfer, redirect and/or other high level and low level call management features.

According to an embodiment, call manager 70 comprises a Voice Over Internet Protocol (VoIP) server that performs the functions of signaling and session management within a packet switched telephony network. The session management functionality of call manager 70 provides the ability to control the attributes of an end-to-end call across multiple networks in communication system 10. For example, in particular embodiments, call manger 70 may support SIP. In such embodiments, call manager 70 may comprise a SIP proxy server that handles all call processing, SIP requests, and SIP responses. In further embodiments, call manager 70 may support other IP telephony protocols such as the H.323 protocol.

The described session management capabilities of call manager 70 may be performed in combination with a conference manager 60. Accordingly, a local conference manager 60 may signal call manager 70 to initiate a conference session with a remote site 30. In response, call manager 70 may thereby communicate with a remote conference manager 60 and/or other components of network 20 to initiate the conference session. Once a conference session is established, call manager 70 may provide any relevant conference identifiers to one or conference managers 60 associated with the sites 30 participating. Such conference identifiers may include the IP address of a session border controller, hub, router, and/or port which may be hosting/supporting the conference.

Session border controller ("SBC") 80 is an intermediary inserted into signaling and/or media pathways between a calling component and a called component of communication system 10. A SBC, such as SBC 80, may generally be used by a service provider to exert control over signaling involved in establishing, conducting, and ending a call. Thus, a SBC may be used to host or otherwise support and maintain a conference session. A SBC may also be used to enforce network policies with respect to various media streams traveling throughout a communication network. In certain embodiments, SBC 80 may proxy a called component of communication system 10 and thereby forward the call, including call data, to the called party. For purposes of this specification, a call or conference session may generally reference both signaling and media associated with a communication session, data or messages transmitted through voice devices, text chat, web sessions, facsimile, instant messaging and e-mail. In the context of system 10, a call may comprise a request to initiate a conference as well as the transfer of media signals associated with the conference. Thus, in operation, SBC 80 may host a conference by routing or otherwise connecting media signals generated at a particular site 30 to one or more other sites 30 participating in the conference.

Service Control Engine (SCE) 90 is a network component operable to monitor real time network communications. Generally, SCE 90 may identify network traffic and apply policies based on certain attributes of the traffic. Such policies may relate to bandwidth reservations, quality of service, access, and routing. Because data traveling through a communication network such as network 20 may take any number of paths to reach a destination, multiple SCEs 90 may be interspersed within the network.

While conferencing, users at sites 30 may participate in a secure conference session wherein conference media data generated by conference equipment 50 is encrypted prior to transmission. The encryption may be performed by conference manager 60 according to any suitable protocol such as secure real-time transfer protocol (SRTP). Encrypting the media data in the packets may secure conference communications by preventing users of network 20 from accessing media data associated with the conference without having the necessary encryption key. Because the media data is encrypted, once the media packets are transmitted into network 102 network components, such as SCE, may be unable to determine that media packets are associated with a conference by inspecting the contents of the payload and/or header. Thus, a service provider servicing network 20 may be unable to determine that media packets contain conference data, let alone that they contain conference data associated with a particular conference. Accordingly, the service provider may be unable to implement subscriber specific and/or application specific policies based solely on the inspection of packet data.

To facilitate policy enforcement, conference manager 60 and SCE 90 may engage in communications that enable the identification of encrypted media traffic. In particular, conference manager 60 may transmit a series of dummy packets immediately following the initiation of a conference session and prior to transmission of media packets. The dummy packets may be similar to a media packet, however the dummy packets may not contain media data associated with the conference (i.e., generated by conference equipment 50). The dummy packets function as a signature which is detectable by SCE 90 and thereby enables SCE 90 to determine whether subsequent media packets traveling through network 20 are associated with the conference. More specifically, the dummy packet signature may serve as a notification that subsequently transmitted packets contain media data associated with a conference. As used herein, a "signature" may be any pattern or code which enables the identification of encrypted media packets.

In an example embodiment of operation, conference manager 60 may generate and transmit dummy packets having various bit sizes according to a particular pattern. Because packet size may be detected notwithstanding the encryption of packet data, the dummy packet signature may be recognized by SCE 90. The pattern may be associated with a signature key and one or more SCEs 90 in network 20 may be programmed to match the pattern with the signature key. The signature key may be a list that corresponds to a series of packets having a plurality of bit sizes. In response to receiving a series of packets matching the signature key, SCE 90 may extract an identification from one or more of the dummy packets. SCE 90 may then monitor network 20 for encrypted media packets which share the same identification as that which was extracted. In certain embodiments, the identification may be unencrypted information such as data contained in the header of an IP packet. Accordingly, the identification may be the source or destination IP address. In such embodiments, the payload (i.e. the portion of the packet containing media data) may be encrypted. In particular embodiments, the dummy packets may contain information which directs SCE 90 to look for or detect packet identification information, such as bytes, in a specific portion of the packet. These bytes may contain information for SCE 90 to analyze such as information about the call and could include standard protocol information such as versioning information for forward and backward compatibility. The dummy packets may also contain additional keying information to uniquely identify a packet stream for security purposes or such.

To further illustrate, the following example is provided wherein conference manager 60 transmits a series of dummy packets of varying sizes. In particular, conference manager 60 may transmit a first dummy packet of 500 bytes, a second dummy packet of 800 bytes, and a third dummy packet of 600 bytes. Each SCE 90 may monitor traffic within network 20 for a series of packets from a common source having 500, 800, and 600 bytes, respectively. In response to receiving a series of packets that matches the defined signature key (i.e. a series of packets having 500, 800, and 600 bytes, respectively), the SCE 90 is thereby alerted to monitor for packets containing conference media data. Subsequent media packet identification may be performed by comparing and matching the source and destination IP addresses associated with the series of dummy packets to the source and destination addresses of subsequent packets. Therefore, when subsequent packets traveling through network 20 are identified as having the same source and destination IP addresses, SCE 90 may apply any relevant policies. It should be noted that while the described dummy packet signature consisted of three dummy packets, the signature may include any number of dummy packets of any suitable bit size.

In a further embodiment, the signature key and signature may be updated or otherwise modified. For example, a particular algorithm may vary the dummy packet transmission pattern according to the time of day or date. Thus, at a first time the dummy packet signature may be three consecutive packets of sizes 300 bytes, 400 bytes, and 500 bytes, respectively. By contrast, at a second time, the dummy packet signature may be three consecutive packets of sizes 600 bytes, 700 bytes, and 800 bytes, respectively. The algorithm may be synchronized between one or more SCEs 90 in network 20 and conference manager 60. Additionally, conference manager 60 may code each media packet with an unencrypted timestamp. Thus, when a packed is received by a particular SCE, the SCE may identify the timestamp and determine whether the packet size matches the signature for the timestamp.

Figure 2:
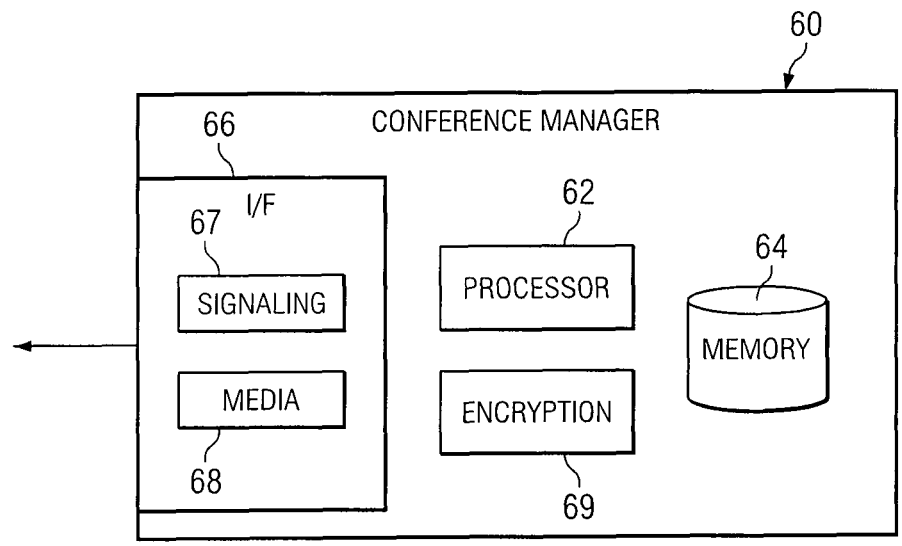
FIG. 2 is a simplified block diagram illustrating a conference manager for the system, in accordance with a particular embodiment.

FIG. 2 illustrates an example embodiment of conference manager 60 which includes a processor 62, a memory 64, and an interface 66. Also included are a signaling module 67, a media module 68, and an encryption element 69. Although the example embodiment may have a certain number, type, and arrangement of components and devices, conference manager 60 may include any suitable number, type, and arrangement of components to provide the described functionality.

Processor 62 controls the operation and administration of conference manager 60 by processing information and signals received from conference equipment 50 and interface 66. Processor 62 may include any suitable hardware, software, or both that operate to control and process signals. For example, processor 64 may be a programmable logic device, a microcontroller, a microprocessor, any suitable processing device, or any combination of the preceding. Additionally, processor 62 may execute code to perform any of the described operations.

Memory 64 may store any data or logic used by processor 62 in facilitating the described functionality of conference manager 60. In certain embodiments, memory 64 may store conference data including one or more packet signatures, encryption algorithms, encryption keys, and/or conference policies. Memory 64 may also store software for execution by processor 62 to control operation and perform the described functionality of conference manager 60. Memory 64 may include any form of volatile or non-volatile memory including, without limitation, magnetic media, optical media, random access memory (RAM), read-only memory (ROM), removable media, or any other suitable local or remote memory component.

Interface 66 is a component that is operable to communicate information and signals to and receive information and signals from a communication network such as network 20 of FIG. 1. As illustrated in FIG. 2, interface 66 represents any port or connection, real or virtual, including any suitable hardware and/or software that may allow conference equipment 50 to exchange information and signals with network 20, other conference equipment 50, call manager 70, and/or any other element of communication system 10.

According to an embodiment, interface 66 includes signaling module 67 and media module 68. Signaling module 67 is a processing layer which may interface with call manager 70 to establish, modify, and terminate a multimedia (e.g. conference) session. In particular, signaling module 67 may signal call manager 70 to connect a local site 30 with a remote site 30 for a conferencing session. Once a session is established, signaling layer may communicate any relevant conference identifiers to media module 68. As mentioned, such information may include the IP address associated with a port, hub, or SBC which may be hosting the conference session.

Media module 68 is a processing layer which may perform media processing and coding functions. In particular, media module 68 may use conference identifiers to encode media packets with an IP address associated with the destination port, site 30, or SBC that may be facilitating the conference. Additionally, media module 68 may interface with a communication network such as network 20 and thereby transmit and receive media data, including packets, associated with a conference. In response to receiving media data generated at a remote site 30, media module 68 may, for example in combination with processor 62, perform any necessary processing functions such as decompressing and/or decoding the data. By contrast, media module 68 may compress and/or encode media data generated by conference equipment 50 at a local site 30 prior to transmission.

Encryption element 69 is a component that is operable to encrypt and decrypt media packets associated with a conference. In particular, encryption element 69 may, for example in combination with processor 62, encrypt the payload of media packets generated at a local site prior to transmission. Correspondingly, encryption element 69 may also decrypt incoming media packets generated at a remote site upon receipt. To facilitate the described encryption and decryption capabilities, encryption module 69 may interface with memory 64 which may store encryption keys and any suitable encryption algorithms.

To illustrate the functionality of conference manager 60, the following example is provided wherein conference manager 60 initiates and facilitates a conference session. At the outset, conference setup may be initiated by signaling module 67. More specifically, prior to the start of a conferencing session, signaling module 67 may signal call manager 70 to initiate a session with a remote site 30. The initiation process may yield a set of conference identifiers which include the IP address associated with a port of a device that is hosting or otherwise facilitating the session. In response to receiving the conference identifiers, signaling module may communicate the identifiers to media module 68. Media module 68 may thereby generate a plurality of dummy packets which conform to one or more dummy packet signatures stored in memory 64. The dummy packets may thereby be encoded and transmitted to the destination IP address provided by the conference identifiers. After transmitting the dummy packets, conference manager 60 may await notification that the dummy packets were received and/or recognized by one or more SCEs 90. Once the conference session has commenced, conference equipment 50 may generate media packets containing audio and/or video data associated with a conference. The generated media packets may be received by conference manager 60 and encrypted by encryption element 69. Prior to, after, or simultaneous with encryption, media module 68 may encode the media packet(s) with source and destination IP addresses. Once the media packet(s) is encoded, the packet(s) may be transmitted via interface 66 to the remote destination.

Modifications, additions, or omissions may be made to conference manager 60. For example, the operations of conference manager 60 may be performed in any suitable order. Additionally, such operations may be performed by more, fewer, or other components. Similarly, components of conference manager 60 may be combined in any suitable manner and the operation may be performed using any suitable logic.

Figure 3:
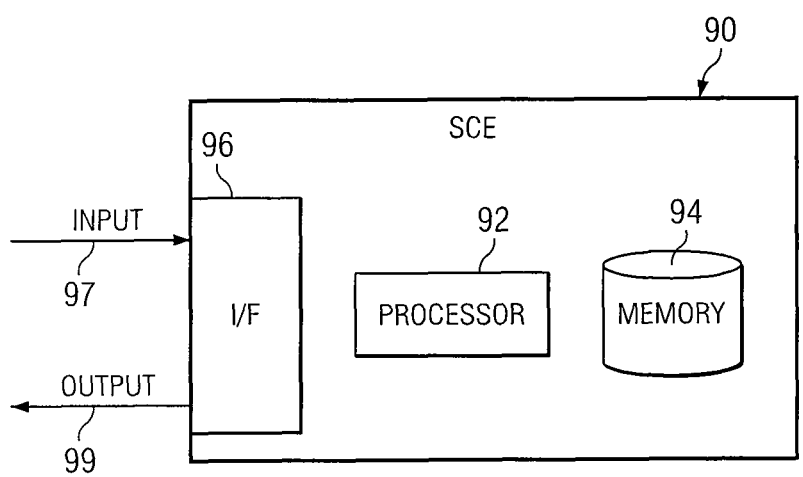
FIG. 3 is a simplified block diagram illustrating a service control engine for the system, in accordance with an embodiment.

FIG. 3 illustrates an example embodiment of SCE 90. As illustrated, SCE 90 includes a processor 92, memory 94, and interface 96. Processor 92, memory 94, and interface 96 may be substantially similar to processor 62, memory 64, and interface 66 described with respect to FIG. 2. In operation, interface 62 may receive packets of data traveling through a network such as network 20 via input traffic stream 97. Processor 92 may, for example in combination with memory 94, analyze network traffic and enforce stored policies relating to the traffic. In particular, processor 92 may monitor the bit size, destination IP address, source IP address, media type, or transmission protocol associated with a particular packet. Additionally, processor 92 may enforce any relevant quality of service policies. After processing, interface 96 may thereby transmit packets to their destination via output stream 99.

In an example embodiment of operation, SCE 90 may enforce relevant quality of service policies for encrypted media traffic. In particular, SCE 90 may analyze network traffic for a plurality of IP packets that match a signature key stored in memory 94. As discussed, the signature may include a series of dummy packets having various bit sizes. Upon receiving a series of packets which matches the defined signature, processor 92 may extract an identification, such as the source and destination IP addresses of one or more of the packets, which may then be stored in memory 94. Concurrently with monitoring for a series of packets associated with one or more applicable signature keys, processor 92 may also monitor traffic for packets having the same identification as a series of packets associated with a previously matched signature. As a result of a prior signature identification, processor 92 may thereby apply relevant conference specific policies for subsequent packets having the same identification. Processor 92 may continue to apply any relevant policies until a communication indicating that the conference has been terminated is received or may time out after not receiving any traffic for some predefined. Additionally, in certain embodiments, memory 94 may track ongoing conference sessions, for example with a table, along with the policies which were applied.

Referring now to FIG. 4, a flow chart illustrating a method for identifying encrypted conference media traffic is provided. The described method begins at step 400 where a plurality of dummy packets may be received by a SCE 90. The dummy packets may be generated and transmitted by a conference manager 60 according to a signature which has a corresponding signature key. In an embodiment, the signature comprises a plurality of packets of various bit sizes and the signature key comprises a list which corresponds to a series of packets having a plurality of bit sizes. As noted, a "dummy packet" may be an ordinary data packet which does not contain conference media data.

In response to receiving a plurality of dummy packets, SCE 90 may determine whether a series of dummy packets matches the signature key at step 402. In a particular embodiments, this determination may be performed on a packet by packet basis. If a given series of packets does not match the signature key, then the process may return to step 402. By contrast, if a series of dummy packets matches the signature key, SCE 90 may, at step 404, extract an identification from one or more of the dummy packets. In an embodiment, the identification includes a source identification that may be associated with the conference site which generated the media packet and a destination identification that may be associated with the destination of the media packet. As mentioned, the destination may be a port, hub, SBC and/or a remote conference site. Additionally, the identification may be an IP address associated with the source or the destination.

After extracting the identification SCE 90 may, at step 406, monitor network traffic for encrypted media packets that have an identification which matches the extracted identification. In addition, the described process may return back to step 400 whereby SCE 90 may receive another set of dummy packets. The new set of dummy packets may be associated with a different conference or may be a redundant transmission by the same conference manager 60 which sent the previous set.

At step 408, SCE 90 may determine that one or more encrypted media packets have an identification which matches the extracted identification. In response to determining that a media packet shares an identification with the one or more of the dummy packets, SCE 90 may associate the media packet with a conference at step 410. More particularly, SCE 90 may associate the media packet with the conference site that transmitted the dummy packet. In addition to associating the encrypted media packet with a conference, SCE 90 may also apply any relevant policies at step 412. As mentioned, such policies may relate to quality of service and include, for example, providing increased bandwidth, priority routing, and/or faster processing.

Modifications, additions, or omissions may be made to the method depicted in FIG. 4. In certain embodiments, the method may include more, fewer, or other steps. Additionally, steps may be performed in any suitable order without departing from the scope of the invention.

While the present invention has been described in detail with reference to particular embodiments, numerous changes, substitutions, variations, alterations and modifications may be ascertained by those skilled in the art, and it is intended that the present invention encompass all such changes, substitutions, variations, alterations and modifications as falling within the spirit and scope of the appended claims.

What is claimed is:

1. A method for identifying conference media traffic comprising:
   receiving a plurality of dummy packets, each of the dummy packets comprising a timestamp;
   matching at a service control engine, without extracting payload information from the dummy packets and without extracting a packet type, a series of the plurality of dummy packets to a signature key associated with the time of day corresponding to a timestamp of one or more of the plurality of dummy packets, the signature key defined by a pattern corresponding to a series of packets, wherein the pattern comprises a first size of a first one of the series of packets and a second size of a second one of the series of packets;
   in response to matching the series of the plurality of dummy packets to the signature key, extracting a first identification different from the signature key from one or more of the plurality of dummy packets;
   determining that a second identification associated with one or more encrypted media packets matches the first identification;
   associating one or more encrypted media packets with a conference in response to determining that the first identification matches the second identification;
   wherein the first identification and the second identification each comprise a source identification and a destination identification; and
   wherein the source identification and the destination identification are Internet Protocol (IP) addresses.

2. The method of claim 1, further comprising applying one or more policies to the one or more encrypted media packets in response to associating one or more encrypted media packets with a conference.

3. The method of claim 1, further comprising updating the signature key.

4. The method of claim 3, wherein updating the signature key comprises changing the signature key based on the time of day.

5. The method of claim 1, further comprising, in response to extracting a first identification from one or more of the plurality of dummy packets, monitoring a network for one or more encrypted media packets having a second identification that matches the first identification.

6. A network apparatus comprising:
an interface operable to:
receive a plurality of dummy packets, each of the dummy packets comprising a timestamp; and
receive one or more encrypted media packets; and
a processor coupled to the interface and operable to:
match at a service control engine, without extracting payload information from the dummy packets and without extracting a packet type, a series of the plurality of dummy packets to a signature key associated with the time of day corresponding to a timestamp of one or more of the plurality of dummy packets, the signature key defined by a-pattern corresponding to a series of packets, wherein the pattern comprises a first size of a first one of the series of packets and a second size of a second one of the series of packets;
in response to matching the series of the plurality of dummy packets to the signature key, extract a first identification different from the signature key from one or more of the plurality of dummy packets;
determine that a second identification associated with one or more of the encrypted media packets matches the first identification;
associate one or more encrypted media packets with a conference in response to determining that the first identification matches the second identification;
wherein the first identification and the second identification each comprise a source identification and a destination identification; and
wherein the source identification and the destination identification are Internet Protocol (IP) addresses.

7. The network apparatus of claim 6, wherein the processor is further operable to apply one or more policies to the one or more encrypted media packets in response to associating one or more encrypted media packets with a conference.

8. The network apparatus of claim 6, wherein the processor is further operable to update the signature key.

9. The network apparatus of claim 6, wherein a processor operable to update a signature key comprises a processor operable to change the signature key based on the time of day.

10. The network apparatus of claim 6, wherein the processor is further operable to monitor a network for one or more encrypted media packets having a second identification that matches the first identification in response to extracting a first identification from one or more of the plurality of dummy packets.

11. A non-transitory computer readable medium including code for identifying encrypted conference media traffic, the code operable to:
receive a plurality of dummy packets, each of the dummy packets comprising a timestamp;
match at a service control engine, without extracting payload information from the dummy packets and without extracting a packet type, a series of the plurality of dummy packets to a signature key associated with the time of day corresponding to a timestamp of one or more of the plurality of dummy packets, the signature key defined by a pattern corresponding to a series of packets, wherein the pattern comprises a first size of a first one of the series of packets and a second size of a second one of the series of packets;
in response to matching the series of the plurality of dummy packets to the signature key, extract a first identification different from the signature key from one or more of the plurality of dummy packets;
determine that a second identification associated with one or more encrypted media packets matches the first identification;
associate one or more encrypted media packets with a conference in response to determining that the first identification matches the second identification;
wherein the first identification and the second identification each comprise a source identification and a destination identification; and
wherein the source identification and the destination identification are Internet Protocol (IP) addresses.

12. The non-transitory computer readable medium of claim 11, wherein the code is further operable to apply one or more policies to the one or more encrypted media packets in response to associating one or more encrypted media packets with a conference.

13. The non-transitory computer readable medium of claim 11, wherein the code is further operable to update the signature key.

14. The non-transitory computer readable medium of claim 13, wherein code operable to update the signature key comprises code operable to change the signature based on the time of day.

15. The non-transitory computer readable medium of claim 11, wherein the code is further operable to monitor a network for one or more encrypted media packets having a second identification that matches the first identification in response to extracting a first identification from one or more of the plurality of dummy packets.

16. A network apparatus comprising:
means for receiving a plurality of dummy packets, each of the dummy packets comprising a timestamp;
means for matching at a service control engine, without extracting payload information from the dummy packets and without extracting a packet type, a series of the plurality of dummy packets to a signature key associated with the time of day corresponding to a timestamp of one or more of the plurality of dummy packets, the signature key defined by a pattern corresponding to a series of packets, wherein the pattern comprises a first size of a first one of the series of packets and a second size of a second one of the series of packets;
means for in response to matching the series of the plurality of dummy packets to the signature key, extracting a first identification different from the signature key from one or more of the plurality of dummy packets;
means for determining that a second identification associated with one or more encrypted media packets matches the first identification;
means for associating one or more encrypted media packets with a conference in response to determining that the first identification matches the second identification;
wherein the first identification and the second identification each comprise a source identification and a destination identification; and wherein the source identification and the destination identification are Internet Protocol (IP) addresses.

* * * * *